(12) United States Patent
Amler et al.

(10) Patent No.: US 12,358,440 B2
(45) Date of Patent: Jul. 15, 2025

(54) LOADING FLOOR FIXATION SYSTEM

(71) Applicant: AUDI AG, Ingolstadt (DE)

(72) Inventors: Manuel Amler, Ingolstadt (DE); Thomas Eberl, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 407 days.

(21) Appl. No.: 17/912,582

(22) PCT Filed: Apr. 6, 2021

(86) PCT No.: PCT/EP2021/058834
§ 371 (c)(1),
(2) Date: Sep. 19, 2022

(87) PCT Pub. No.: WO2021/259531
PCT Pub. Date: Dec. 30, 2021

(65) Prior Publication Data
US 2023/0211742 A1 Jul. 6, 2023

(30) Foreign Application Priority Data
Jun. 25, 2020 (DE) .................. 10 2020 116 798.9

(51) Int. Cl.
B60R 13/01 (2006.01)
B62D 25/20 (2006.01)

(52) U.S. Cl.
CPC ............. B60R 13/01 (2013.01); B62D 25/20 (2013.01)

(58) Field of Classification Search
CPC ............... B62D 25/20; B62D 25/2054; B62D 25/2027; B60R 13/01; B60R 13/011; B60R 13/0206; B60R 13/0268; B60R 2013/018; B60R 2013/0293
See application file for complete search history.

(56) References Cited

U.S. PATENT DOCUMENTS

| 6,050,630 A * | 4/2000 | Hochet ................ B60N 2/5891 296/193.07 |
| 9,908,475 B2 * | 3/2018 | Ayala Diaz ............. E05B 85/10 |
| 10,196,000 B2 * | 2/2019 | Loew ....................... B60R 7/02 |
| 10,272,843 B2 * | 4/2019 | Karger .................... B60R 5/044 |

(Continued)

FOREIGN PATENT DOCUMENTS

| CN | 101323265 A | 12/2008 |
| CN | 102470798 A | 5/2012 |

(Continued)

OTHER PUBLICATIONS

International Preliminary Report on Patentability issued on Dec. 13, 2022, in corresponding International Application No. PCT/EP2021/058834, 12 pages.

(Continued)

Primary Examiner — Gregory A Blankenship
(74) Attorney, Agent, or Firm — Maier & Maier, PLLC

(57) ABSTRACT

A system for fixing the loading floor in a motor vehicle, including a loading floor support and at least one loading floor. The loading floor support includes at least one latching element, and the loading floor has at least one molded element which is adapted to latch onto the at least one latching element of the loading floor support. The system is adapted, based on the latching, to lock the loading floor on the loading floor support.

14 Claims, 3 Drawing Sheets

(56) References Cited

U.S. PATENT DOCUMENTS

| | | | |
|---|---|---|---|
| 10,513,225 B2* | 12/2019 | Gawade | B62D 43/10 |
| 11,110,969 B2* | 9/2021 | Rettick | E02F 9/16 |
| 11,420,565 B2* | 8/2022 | Ritter | B60R 13/013 |
| 2013/0278020 A1* | 10/2013 | Preisler | B32B 15/20 |
| | | | 296/193.07 |
| 2013/0280473 A1* | 10/2013 | Preisler | B32B 3/26 |
| | | | 428/116 |
| 2015/0251712 A1* | 9/2015 | Craven | B60R 5/04 |
| | | | 296/37.2 |
| 2018/0022293 A1* | 1/2018 | Fischer | B60P 1/286 |
| | | | 296/39.2 |
| 2023/0211742 A1* | 7/2023 | Amler | B62D 25/20 |
| | | | 296/193.07 |

FOREIGN PATENT DOCUMENTS

| | | |
|---|---|---|
| CN | 103101454 A | 5/2013 |
| CN | 104960463 A | 10/2015 |
| DE | 102010056400 A1 | 6/2012 |
| DE | 102013018037 A1 | 6/2015 |
| DE | 102014015030 A1 | 4/2016 |
| DE | 202015008707 U1 | 3/2017 |
| DE | 102016013687 A1 | 5/2018 |
| DE | 202017001105 U1 | 5/2018 |

OTHER PUBLICATIONS

International Search Report issued on Jul. 5, 2021, in corresponding International Application No. PCT/EP2021/058834, 5 pages.

Examination Report issued on Feb. 17, 2021, in corresponding German Application No. 10 2020 116 798.9, 6 pages.

Examination Report issued on Mar. 9, 2022, in corresponding German Application No. 10 2020 116 798.9, 6 pages.

Office Action issued on Mar. 27, 2025, in corresponding Chinese Application No. 202180027491.7, 16 pages.

\* cited by examiner

LOADING FLOOR FIXATION SYSTEM

FIELD

The present invention relates to a system for loading floor fixation in a motor vehicle, comprising a loading floor support and at least one loading floor, wherein the loading floor support comprises at least one latching element.

BACKGROUND

Retaining profiles for loading floors are known in the prior art.

Document DE 10 2010 056 400 A1 discloses a loading floor for a loading space which comprises a loading floor panel which has a tooth-shaped profile on at least one side for engaging in a complementary holding profile on the motor vehicle as well as a method for adjusting a loading space volume.

Document DE 10 2016 013 687 A1 discloses a fastening device for fastening a loading floor support of a trunk arrangement to a side wall of the trunk arrangement for a vehicle. The side wall has a latching interface that is integrally integrated and can be latched into a mating latching interface of a loading floor support.

A motor vehicle with a device for holding a loading floor is known from document DE 20 2015 008 707 U1. The motor vehicle comprises a rear loading space which has a device for holding the loading floor, which device is produced integrally with a trim part and extends through a through-opening in the loading floor.

In the prior art, additional elements for fixing, in particular in the Z-direction, are welded or screwed on to fix loading floors in the area of the rear seat benches of a vehicle.

SUMMARY

The object of the present invention is to provide a system that enables improved loading floor fixation which is easier to produce and more cost-effective.

This object is achieved by a system, a loading floor, and a method. Advantageous further developments and embodiments are the subject of the description and description of the figures.

The subject matter of the present invention is a system for loading floor fixation in a motor vehicle, comprising a loading floor support and at least one loading floor, wherein the loading floor support comprises at least one latching element.

According to the invention, the loading floor has at least one molded element which is adapted to latch onto the at least one latching element of the loading floor support, wherein the system is adapted based on the latching action to lock the loading floor on the loading floor support. The loading floor, in particular the molded element, is configured and adapted in such a way that the loading floor can be fixed or locked on at least one other component of the motor vehicle, in particular the latching element of the loading floor support. As a rule, the system is arranged in the area of a rear seat bench of a motor vehicle. The system offers the advantage that a loading floor can be fixed without additional attachments.

The latching element can usually be applied to the loading floor support using the injection molding process. The latching element is configured as the male part of a sliding/plug-in closure. The latching element is configured as a projection which is adapted to engage in the molded element when the loading floor is pushed onto the loading floor support.

The latching element is typically configured as a click element which is adapted to be compressible by the molded element of the loading floor when the loading floor is slid on, and to unfold when an end position of the sliding-on process is reached, and thereby to lock the loading floor. The latching element is generally configured to be compressible, wherein the latching element has at least one slot which enables the latching element to be compressed.

The latching element generally extends at a right angle to the loading floor support and is between 1 mm and 50 mm, in particular between 20 mm and 30 mm wide, the latching element having the at least one slot in the middle. The slot is generally formed at a right angle to the loading floor support and has a width of between 1 mm and 5 mm, in particular between 3 mm and 4 mm.

The molded element is generally configured to correspond to the geometry of the latching element. The form element is configured as the female part of the sliding/plug-in closure. The molded element has at least one recess which is configured to accommodate the at least one projection of the latching element, the male part of the sliding/plug-in closure. The molded element of the loading floor offers the advantage that it can be easily implemented in the manufacturing process of the loading floor and therefore does not lead to any special processes.

The molded element is generally recessed between 10 mm and 50 mm, in particular between 30 mm and 40 mm deep in the loading floor. The molded element has a width between 10 mm and 50 mm, in particular between 30 mm and 45 mm.

In one embodiment, the system is adapted to lock the loading floor on the loading floor support in an X-direction and/or in a Z-direction. The system is adapted in such a way that the loading floor with the at least one molded element can be pushed onto the latching element of the loading floor support. By sliding the loading floor onto the loading floor support, the latching element latches with the projection and the deflection on the molded element both in the X direction and in the Z direction.

The system thus offers the advantage that, with the geometry introduced, additional components can be dispensed with, and an X-direction and Z-direction of the latching can be implemented via the support of the loading floor. The loading floor can thus be locked both in an X direction and in a Z direction.

In a further development, the molded element is configured to be integrally stamped into the loading floor. In this case, the molded element can already be stamped into the loading floor during a pressing process of the loading floor. The introduction of the molded element therefore does not require a separate process, such that the molded element can be implemented in the manufacturing process of the loading floor.

In a further development, the molded element is U-shaped, with the U-shape in the molded element forming a latching surface which is formed perpendicular to a contact surface of the loading floor with the loading floor support. The molded element is formed as a recess stamped into the loading floor. The U-shaped design of the molded element offers the advantage that the latching element can be pushed into the molded element from the side.

In a further development, the latching surface is rounded or beveled at least in sections. The latching surface is rounded or beveled at least in sections. The rounded or beveled latching surface of the molded element offers the advantage that the latching element can latch on or latch behind in the area of the rounded or angled latching surface of the molded element. The latching-on or latching-in of the latching element in the area of the rounded or angled latching surface of the molded element leads to locking the latching element on the at least one rounded or angled latching surface of the molded element.

The latching element generally has a deflection at the end of the projection facing the loading floor, which is adapted to latch or rest on the latching surface of the U-shaped molded element. As a rule, the deflection is configured as an extension of the projection, which is configured substantially parallel to the loading floor support. Optionally, the deflection is angled starting from the projection. As a rule, the deflection is T-shaped.

In one embodiment, the latching element is configured as a hook, in particular as a latching hook. The latching element is usually applied to the loading floor support in an injection molding process. The latching element has an end proximate to the loading floor support and an end distal from the loading floor support. At its end distal from the loading floor support, the latching element is T-shaped in an X-direction and is adapted as a circumferential Z-support surface in a Z-direction. The Z support surface corresponds to the deflection of the latching element.

In a further development, the latching element is adapted to latch at least partially behind or onto the molded element and/or to latch fully behind the same. In this case, a respective latching element is generally adapted to latch into a respective molded element by means of forces to enable latching behind.

In a further development, the molded element is configured to correspond geometrically to the latching element. The molded element and the latching element together usually form the sliding/plug-in closure. The form element is a female part of the sliding/plug-in closure and the latching element is a male part of sliding/plug-in closure. The loading floor with the molded element is configured to be pushed and clicked onto the loading floor support.

The present invention also relates to a loading floor for a loading floor fixation system as described above.

According to the invention, the loading floor has at least one molded element which is stamped into the loading floor and is configured and adapted to accommodate at least one latching element.

The latching element is usually made by an injection molding process off the tool on the loading floor support. The latching element is configured as a latching hook or barb. As a rule, the latching element has the at least one slot, as a result of which the latching element is adapted to be compressible when it is inserted into the molded element.

The molded element is stamped into the loading floor. Optionally, the molded element is stamped into the loading floor in such a way that the loading floor is at least partially interrupted. The molded element has at least one recess which is adapted to accommodate the projection of the latching element. The recess of the molded element is T-shaped, for example. The molded element is configured as the female part of the sliding/click closure. The latching element is configured as the male part of a sliding/click closure.

The present invention also relates to a method for producing a loading floor comprising an element for a loading floor fixation system as described above.

In a first step, the loading floor is pressed. In another step, which takes place at the same time as the first step, at least one molded element is stamped into the loading floor during pressing.

The present invention also relates to a method for producing a latching element for a loading floor fixation system described above, wherein the latching element is produced on the loading floor support by means of an injection molding process.

BRIEF DESCRIPTION OF THE FIGURES

The invention is schematically illustrated in the drawing based on embodiments and is described in more detail with reference to the drawing. Wherein.

DETAILED DESCRIPTION

Figure 1:
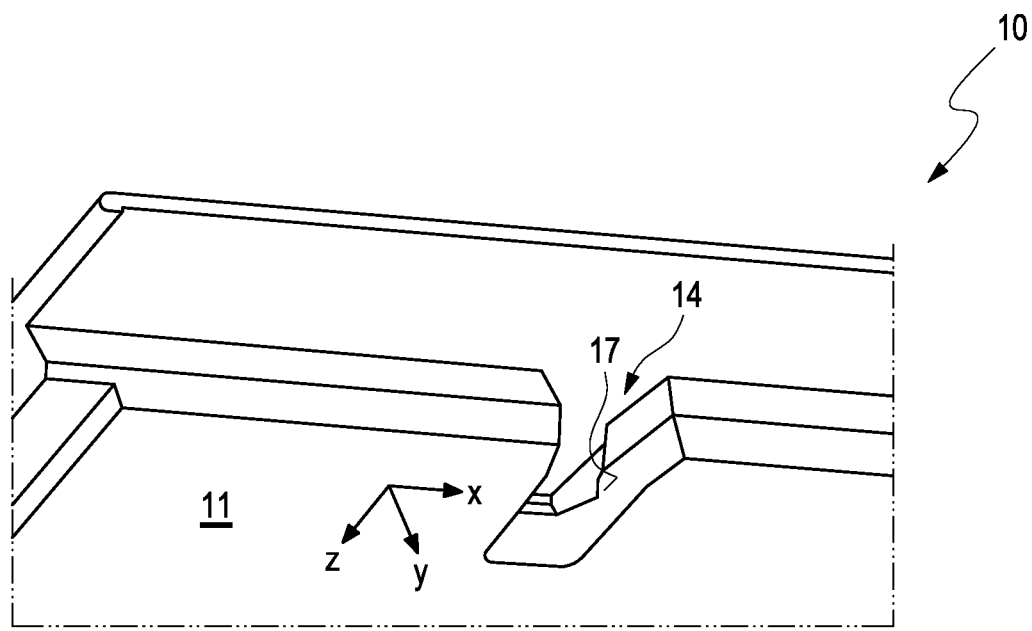
FIG. 1 shows a loading floor with a molded element of the loading floor fixation system.

FIG. 1 shows a loading floor 11 with a molded element 14 of the loading floor fixation system 10. In the present embodiment, the loading floor 11 has a U-shaped molded element 14. The U-shaped molded element 14 is stamped into the loading floor 11. The U-shaped molded element 14 is formed in the loading floor 11 in the Z-direction.

The U-shaped design of the molded element 14 allows insertion of a latching element not shown here. The molded element 14 is U-shaped, wherein the U-shape in the molded element 14 forms a latching surface 17 which is perpendicular to a contact surface of the loading floor 11 with a loading floor support not shown here. The latching surface 17 is rounded or beveled.

Figure 2:
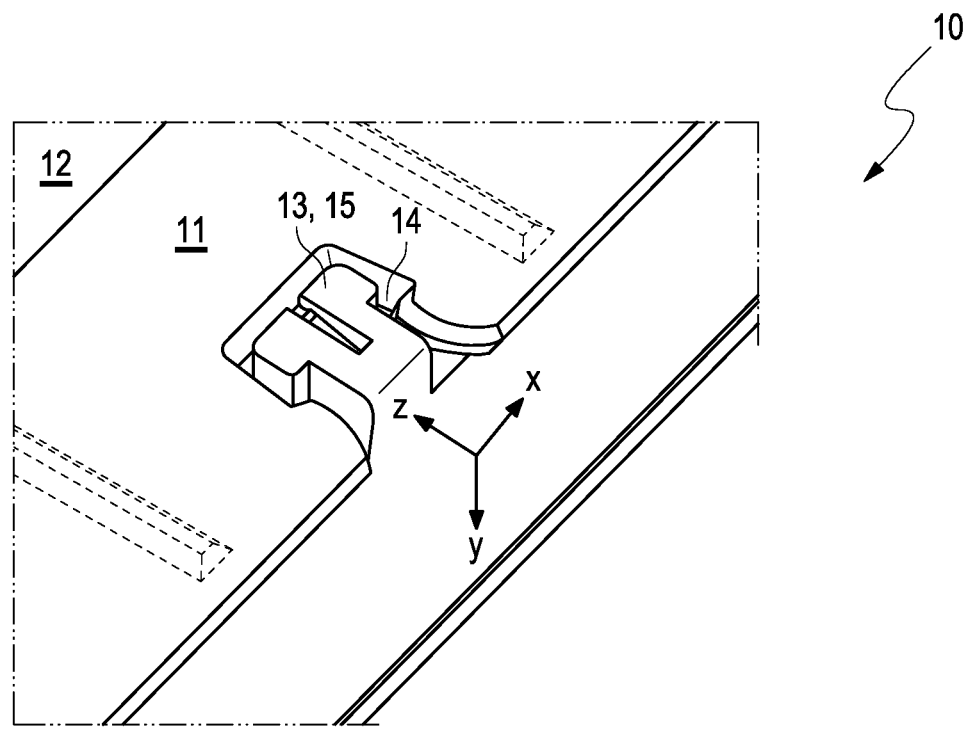
FIG. 2 shows a top view of the loading floor fixation system with the loading floor placed on a loading floor support with a molded element latched onto a latching element.

FIG. 2 shows a top view of the loading floor fixation system 10 with the loading floor 11 placed on the loading floor support 12 with the molded element 14 latched on the latching element 13.

The latching element 13, which is configured as a projection 15, is produced off the tool on the loading floor support 12, usually by means of an injection molding process. The latching element 13 is configured as a latching hook or barb. The latching element 13 has an end close to the loading floor support and an end remote from the loading floor support, the latching element 13 having a T-shaped configuration at its end remote from the loading floor support.

The molded element 14 is stamped into the loading floor 11. Optionally, the molded element 14 is stamped into the loading floor 11 in such a way that the loading floor 11 is at least partially interrupted. In this case, the molded element 14 is in particular configured as a click closure. The molded element 14 has a T-shaped configuration in the X direction.

The molded element 14 is usually formed geometrically corresponding to the latching element 13 to form a sliding/click closure or a sliding/plug-in closure. The loading floor 11 with the molded element 14 is configured to be slid or clicked onto the loading floor support 12. While it is being slid on, the molded element 14 latches on the latching element 13 of the loading floor support 12 both in the X direction and in the Z direction.

Figure 3:
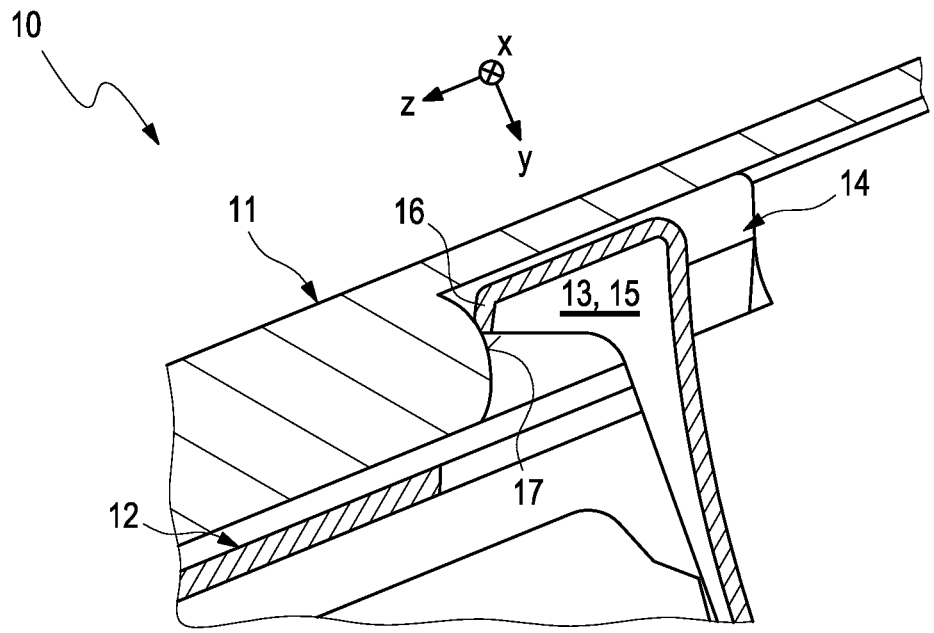
FIG. 3 shows a longitudinal section through the loading floor fixation system with the molded element and the latching element latched into the molded element.

FIG. 3 shows a longitudinal section through the loading floor fixation system 10 with the molded element 14 and the latching element 13 latched into the molded element 14.

The latching element 13 is formed on the loading floor support 12. In the present embodiment, the latching element 13 is configured as a projection 15, in particular as a latching hook. In the present embodiment, the latching element 13 also has a peripheral Z support or a deflection 16 which extends parallel to the loading floor support 12, starting from the projection 15 at an end of the latching element 13 distal from the loading floor support.

The molded element 14 is formed in the loading floor 11, wherein the molded element 14 is U-shaped, wherein the U-shape of the molded element 14 forms a latching surface 17 which is perpendicular to a contact surface of the loading floor 11 with a loading floor support 12 not shown here. The latching surface 17 is rounded or beveled.

The molded element 14 is configured to correspond to the geometric shape of the latching element 13. In the present embodiment, the loading floor 11 is shown with the molded element 14 plugged onto the loading floor support 12 with the latching element 13. The latching element 13 is adapted to lock in the X direction by sliding the molded element 14 on and to lock in the Z direction by latching a deflection 16 or a Z support on the beveled latching surface of the U-shaped molded element 14.

Figure 4:
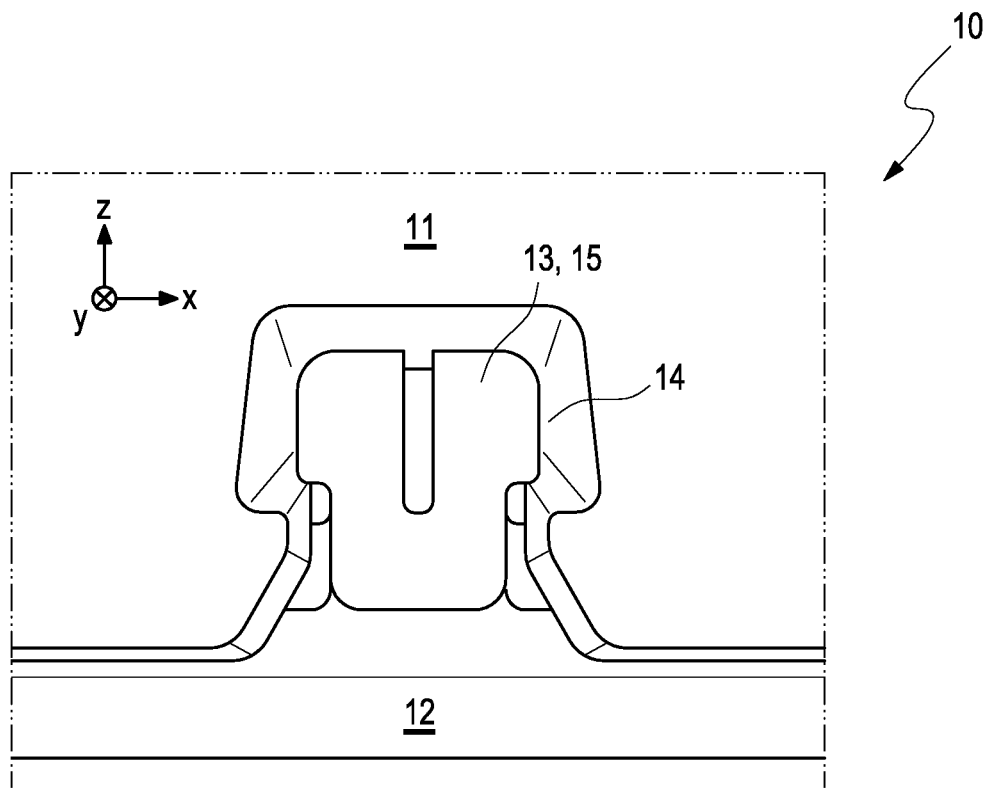
FIG. 4 shows a top view of the loading floor fixation system with the molded element and the latching element latched into the molded element.

FIG. 4 shows a top view of the loading floor fixation system 10 with the molded element 14 and the latching element 13 latched into the molded element 14 and configured as a projection 15. The form element 14 is configured as a female part of the sliding/plug-in closure, while the latching element is configured as a male part of sliding/plug-in closure.

The loading floor 11 with the molded element 14 is adapted to get caught on the latching element 13 when it is slid onto the loading floor support 12 and to form a locking connection, in particular one sliding/plug-in connection, both in the X-direction and in the Z-direction.

Figure 5:
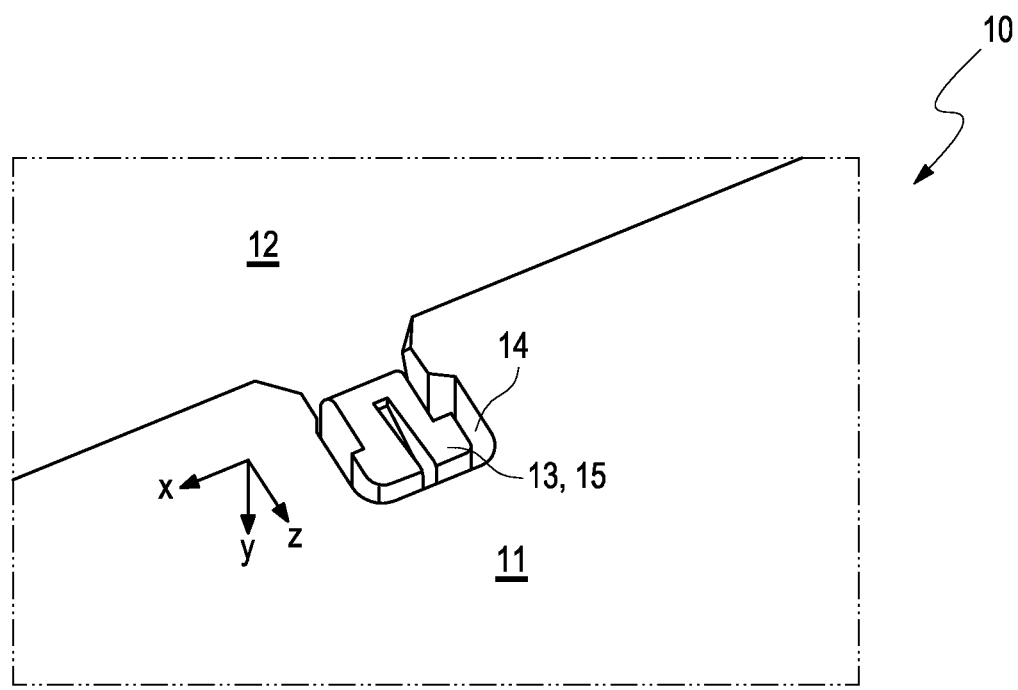
FIG. 5 shows a perspective view of the latching element in the latched state in the molded element of the loading floor fixation system.

FIG. 5 shows a perspective view of the latching element 13 in the latched state in the molded element 14 of the loading floor fixation system 10. In the loading floor fixation system 10, the loading floor 11 with the molded element 14 is slid or latched onto the loading floor support 12 with the latching element 13 and thus latched both in the X direction and in the Z direction. The molded element 14 is slid onto the latching element 13 such that the at least one projection 15 of the latching element 13 engages and latches in the at least one recess of the molded element 14.

Figure 6:
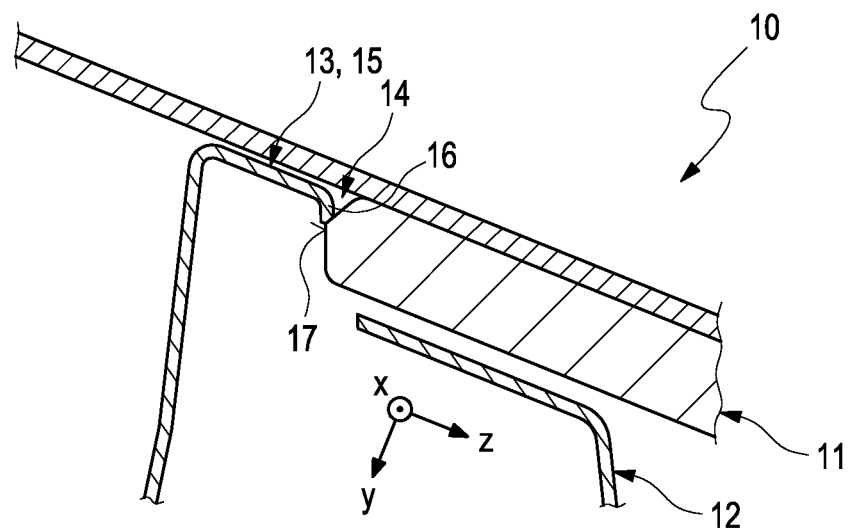
FIG. 6 shows a schematic side view of the loading floor fixation system with the loading floor with the molded element and the loading floor support with the latching element.

FIG. 6 shows a schematic side view of the loading floor fixation system 10 with the loading floor 11 with the molded element 14 and the latching element 13 of the loading floor support 12. The present embodiment shows that, when the latching element 13 is in a latched state in the molded element 14 of the loading floor 11, the latching element 13 latches on a rounded or beveled surface of the molded element 14, a latching surface 17, both in the X direction and in the Z direction. In addition, it is shown that the latching element 14 is formed from the projection 15 and the deflection 16.

LIST OF REFERENCE NUMERALS 10 system
11 loading floor
12 loading floor support
13 latching element
14 molded element
15 projection
16 deflection
17 latching surface

The invention claimed is:

1. A system for fixing a loading floor in a motor vehicle, comprising:
    a loading floor support and at least one loading floor,
    wherein the loading floor support comprises at least one latching element,
    wherein the loading floor comprises at least one molded element defined in the plane of the loading floor and adapted to latch onto the at least one latching element of the loading floor support by sliding the loading floor onto the loading floor support,
    wherein the system is adapted, based on a latching of the molded element and the latching element, to lock the loading floor on the loading floor support;
    wherein the molded element is formed integrally and stamped into the loading floor;
    wherein the molded element includes a latching surface in the molded element,
    wherein the latching surface extends in a direction perpendicular to the plane of the loading floor, and
    wherein the latching surface is rounded or beveled in a direction parallel to the plane of the loading floor.

2. The system according to claim 1, wherein the system is adapted to lock the loading floor on the loading floor support in an X-direction and/or in a Z-direction, the X-direction and the Z-direction being parallel to the plane of the loading floor.

3. The system according to claim 1, wherein the molded element is formed integrally and stamped into the loading floor.

4. The system according to claim 1, wherein the latching surface is rounded or beveled at least in sections.

5. The system according to claim 1, wherein the latching element is configured as a hook.

6. The system according to claim 5, wherein the latching element is adapted to at least partially latch on or latch behind the molded element.

7. The system according to claim 1, wherein the molded element is configured to correspond geometrically to the latching element.

8. A loading floor for a system according to claim 1, wherein the loading floor has at least one molded element which is stamped into the loading floor and is configured to accommodate at least one latching element.

9. A method for producing a loading floor comprising a molded element for a system according to claim 1, comprising the steps:
    a. pressing the loading floor,
    b. stamping the at least one molded element into the loading floor during pressing.

10. The system according to claim 2, wherein the molded element is configured to correspond geometrically to the latching element.

11. The system according to claim 3, wherein the molded element is configured to correspond geometrically to the latching element.

12. The system according to claim 4, wherein the molded element is configured to correspond geometrically to the latching element.

13. The system according to claim 5, wherein the molded element is configured to correspond geometrically to the latching element.

14. The system according to claim 6, wherein the molded element is configured to correspond geometrically to the latching element.

\* \* \* \* \*